Feb. 29, 1944.   O. T. STALL   2,342,907
TRAILER HITCH
Filed July 18, 1941
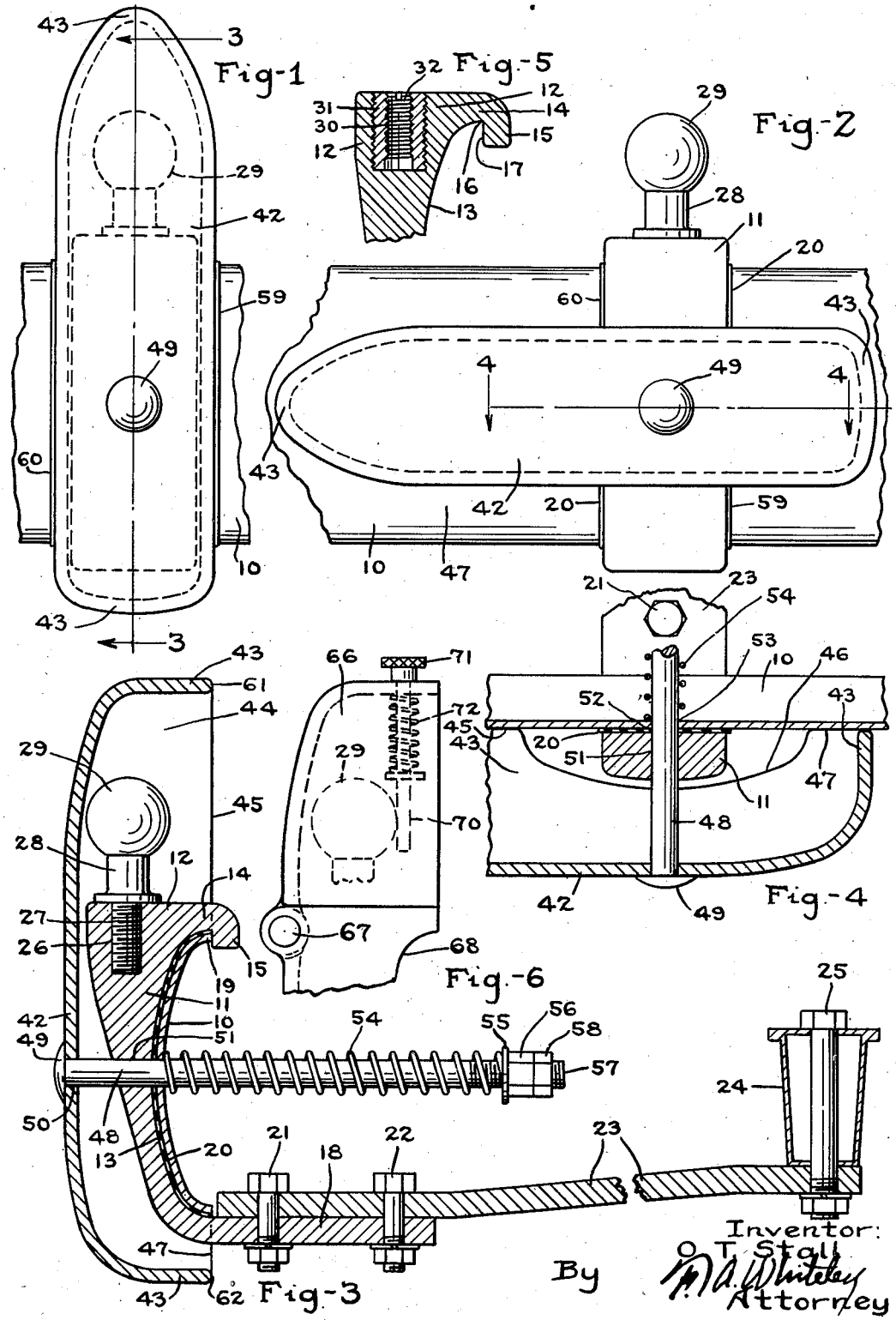

Patented Feb. 29, 1944

2,342,907

UNITED STATES PATENT OFFICE 2,342,907

TRAILER HITCH

Orville T. Stall, St. Paul, Minn.

Application July 18, 1941, Serial No. 402,990

5 Claims. (Cl. 293—55)

My invention relates to a trailer-hitch construction and has for its object to provide a trailer-hitch directly supported by a bumper of an automobile truck or the like and connected with the frame of an automobile in combination with guard means adapted to conceal the hitch and give the bumper its ordinary appearance when the hitch is not being used.

Trailers of various sorts are common being attached in different ways to the rear of an automobile by means which permits both up and down and lateral movements. Various efforts have been made to form the hitch for trailers directly on the bumpers of automobiles, trucks and the like. These efforts have not been satisfactorily successful for two reasons,—first, with the hitch secured to the bumper in the ordinary way it is exposed to view during all those periods of time when the automobile does not have a trailer hitched to it, and, second, the trailer hitches which take their draft directly through the bumper may deform or even break the bumper.

It is an object of my invention, therefore, to obviate each of these objectionable features by providing a hitch construction which is merely supported by the bumper while a draft bar runs directly to the frame of the automobile in combination with a guard to overlie the hitch when it is not in use for towing a trailer or the like.

It is a further object of my invention to so arrange the guard that it may be conveniently and readily positioned extending along the length of the bumper when the hitch is in operation or upright so as to conceal the hitch mechanism when the automobile is in normal operation and no trailer hitched thereto.

The full objects and advantages of my invention will appear in connection with the detailed description thereof, and the novel features by which the above referred to advantageous results are obtained are particularly pointed out in the claims.

In the drawing illustrating an application of my invention in one form—

Fig. 1 is a front elevation view of my trailer-hitch with the bumper guard in vertical position to conceal the hitch mechanism, and only a fragmentary portion of the bumper shown.

Fig. 2 is a view similar to Fig. 1 with the guard in horizontal position exposing the hitch mechanism for attaching the draft bar of a trailer or other device thereto.

Fig. 3 is a side elevation sectional view taken on line 3—3 of Fig. 1.

Fig. 4 is a transverse sectional side elevation view taken on line 4—4 of Fig. 2.

Fig. 5 is a fragmentary sectional elevation view of the hitch body showing bushing reducers adapting different sized trailer draftbars to be attached thereto.

Fig. 6 is a side elevation view of a modified form of the invention.

As shown, the rear bumper 10 of an automobile, of usual construction, has applied thereto a member 11 which may be a casting or other suitably fabricated part and which is provided with a top body portion 12 and an inner surface 13 conforming in shape to the outer cross sectional contour of the bumper, as clearly shown in Figs. 3 and 5. The body portion 12 has a forwardly projecting arm 14 formed with a flange-like depending part 15 which produces a notch 16 having a vertical or right line face 17, as best shown in Figs. 3 and 5. The member 11 is also provided with a rearwardly extending arm 18, shown in detail in Fig. 3. The construction is such that when the hook 15 is placed over the inner upper edge 19 of bumper 10 it will take the position indicated in Figs. 2 and 3, with the inner surface 13 following the outer contour of bumper 10, and the arm 18 extended in a substantially horizontal direction beneath the bumper and toward the rear of the car.

The surface 13 is preferably lined with a strip of rubber material 20 which will prevent marking of outer surface of the bumper in the event that it is desired to remove the member 11 therefrom and also which will afford a certain amount of cushioning effect. To the arm 18 is secured by means of bolts 21 and 22 a draft bar 23 which has its front end secured to a frame member 24 by means of a bolt 25. In practice the arm 18 and bar 23 and the holes for bolts 21 and 22 will be formed as to position and length so as to fit the frame member for any particular car, but obviously this connection can be made adjustable as to length for application to different makes of cars.

The body portion 12 of member 11 is normally provided with a threaded opening 26 adapted to receive the threaded stem 27 of a hitch member 28 formed at its upper end with a ball 29. This ball is adapted to receive the draft bar of a trailer and have it secured thereto in a well known way. A variant is shown in Fig. 5 in which a threaded bore 30 receives an internally hollow filler member 31 which in turn may be closed with a screw member 32. This arrangement permits the attachment of draft bars of trailers not adapted to be applied to ball 29. It is, however, within the scope of my invention to provide any form of draft bar attachment which is secured to the body portion 12 of the securing device. From the above it will be seen that the trailer will be hitched directly to the frame through a member supported on the rear bumper so that while the bumper furnishes a suitable support holding the attaching member 29 in appropriate position, it takes practically none of the strain in pulling the trailer.

In practice a trailer will be hitched to any automobile a relatively small part of the time. Yet to have the hitch means available at any time is distinctly desirable and it is further desirable to provide some sort of means to cover up the hitch means as such when it is not in use. I provide this means in the following manner: a bumper guard 42 of substantially common construction in external appearance is formed with a surrounding lip 43 providing a chamber 44 open at the rear as indicated at 45 of Fig. 3. The sides of the surrounding lip 43 are cut out, as indicated in Fig. 3 and as indicated at 46 in Fig. 4, to receive the outer wall 47 of the bumper 10 so that when the bumper guard 42 is in vertical position as shown in Fig. 3, the cut out portions 46 will engage the outer contour of the bumper 10 and the hitch parts 11, 12, 28 and 29 will all be housed in the chamber 44 and concealed by the bumper guard 42 and the lip 43 thereon surrounding the chamber 44.

To hold the bumper guard 42 in position on the bumper an elongated bolt 48 having a broad head 49 extends through an opening 50 in the rear wall of bumper guard 42 and through alined openings 51, 52 and 53 in the hitch member 11, the protector lining 20 and the top 47 of the bumper 10, as clearly shown in Figs. 3 and 4. Upon the shank of bolt 48 is positioned a compression spring 54 which engages at one end the inner wall of bumper 10 and at the other end a washer 55 held in position by a nut 56 screwed on the threaded end 57 of the bolt 48. A lock nut 58 holds the nut 56 and washer 55 in desired adjusted position.

The spring 54 is of sufficient strength so that when the bumper guard is positioned as shown in Fig. 1, it will carry the cut out edges 49 of surrounding lip member 43 into engagement with parts 59 and 60 of the protector strip 20 which parts extend beyond the side limits of the hitch member 11 and under bumper guard 42 when in vertical position, as shown in Fig. 1. It is, of course, the fact that the lip portion 43 is cut out to receive the whole body of the bumper 10 and thus in effect overlie the top and bottom edges thereof that enables the spring 54 to keep the bumper guard permanently in its vertical position notwithstanding the shaking and jar of the driven automobile.

The position of the bumper guard in Figs. 1 and 3 is its normal position when a trailer is not hitched to the automobile. When it is desired to use the trailer hitch, it is only necessary to take hold of the inner edges 61 and 62 of the ends of the bumper guard 42 and by pulling outwardly the spring 54 will be compressed and the bolt 48 be drawn through the openings 51, 52 and 53 until the edges of the lip member 43 will clear the hitch mechanism whereupon the operator will turn the bumper guard at right angles to its former position and permit it to seat against the outer surface 47 of the bumper, in which position the cut out parts 46 of the lip portion 43 will receive the hitch member 11, as clearly shown in Fig. 4. With the parts in this position the spring 54 will now hold the bumper guard in the position indicated in Fig. 2.

As a variant form I may in some cases hinge a cap member 66, as indicated at 67 Fig. 6, to the lower part 68 of the bumper guard and hold this cap member in position by means of a plunger 70 adapted to be drawn up by a hand piece 71 and held in position by a compression spring 72.

The advantages of my invention will be apparent from the foregoing description. By a very simple but highly effective arrangement I am able to provide a trailer hitch which is permanently attached to the automobile, supported by the bumper, and yet connected directly with the frame of the machine, and at the same time, to provide means for concealing the trailer hitch when the same is not in use, which means has simply the appearance of an ordinary bumper guard. This gives a high degree of utility and efficiency and is economical to manufacture and simple and easy to install.

I claim:

1. A trailer-hitch comprising a hitch block formed with a hook adapted to overlie the upper edge of a rear bumper and a portion curved to fit and engage the outer part thereof, means connecting the hitch block to the frame of the automobile, a bumper guard also supported by the rear bumper and comprising a curved cut-out portion adapted to engage the outer surface of the bumper at either side of the hitch block, and said bumper guard adapted in one position to conceal the hitch block and in another position to uncover the hitch.

2. A trailer-hitch comprising a hitch block supported by a rear bumper, a bumper guard also supported by the rear bumper and comprising a curved cut-out portion adapted to engage the outer surface of the bumper at either side of the hitch block, and means for holding the bumper guard in a vertical position to conceal the hitch block, said means permitting the bumper guard to be removed from the hitch block and swung into horizontal position where the cut-out portion of the bumper guard will receive within it the part of the hitch block extending along the bumper.

3. A trailer-hitch comprising a hitch block supported by a rear bumper, a bumper guard also supported by the rear bumper and comprising a curved cut-out portion adapted to engage the outer surface of the bumper at either side of the hitch block, and a long bolt passing through the bumper guard hitch block and bumper in a horizontal direction, a compression spring on said bolt held in engagement with the inside of the bumper and exercising sufficient force to hold the bumper in either vertical or horizontal position, said bolt and spring permitting the bumper guard to be drawn away from over the hitch mechanism and turned into horizontal position and vice versa.

4. A trailer-hitch comprising a hitch block supported by a rear bumper, draft bar fastening means thereon, a sectional bumper guard also supported by the rear bumper and having a curved cut-out portion adapted to engage the outer surface of the bumper at either side of the hitch block, and a sectional member of the bumper guard hinged thereto in the plane of the top of the hitch block and adapted to be swung away from the fastening means on the hitch block to expose the same, and a hand operated member for holding the hinged part of the bumper guard in position to conceal the upper part of the hitch block mechanism.

5. A trailer-hitch comprising a hitch block supported by the rear bumper and formed with an attaching member extending above the upper edge of the hitch block, means connecting the hitch block to the frame of the automobile, a bumper guard also supported by the rear bumper and being adapted in one position to cover the attaching mechanism of the hitch block and in another position to uncover such attaching mechanism, and means associated with the bumper guard to permit it to be moved into either of said positions.

ORVILLE T. STALL.